United States Patent
Song

(10) Patent No.: US 12,412,715 B2
(45) Date of Patent: Sep. 9, 2025

(54) RELAY DEVICE AND ELECTRIC VEHICLE CHARGING CONTROLLER COMPRISING SAME

(71) Applicant: LG INNOTEK CO., LTD., Seoul (KR)

(72) Inventor: Il Jong Song, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 17/929,030

(22) PCT Filed: Jan. 28, 2021

(86) PCT No.: PCT/KR2021/001126
§ 371 (c)(1),
(2) Date: Aug. 10, 2022

(87) PCT Pub. No.: WO2021/162291
PCT Pub. Date: Aug. 19, 2021

(65) Prior Publication Data
US 2023/0154709 A1  May 18, 2023

(30) Foreign Application Priority Data
Feb. 10, 2020  (KR) ........................ 10-2020-0015865

(51) Int. Cl.
*H01H 47/36* (2006.01)
*B60L 15/20* (2006.01)
(Continued)

(52) U.S. Cl.
CPC ............. *H01H 47/32* (2013.01); *B60L 15/20* (2013.01); *B60L 50/60* (2019.02); *B60L 53/14* (2019.02); *B60L 2210/10* (2013.01)

(58) Field of Classification Search
CPC ......... H01H 47/32; B60L 15/20; B60L 50/60; B60L 53/14; B60L 2210/10; B60L 2270/147
(Continued)

(56) References Cited

U.S. PATENT DOCUMENTS

| | | | |
|---|---|---|---|
| 2004/0150433 A1 | 8/2004 | Hourai | |
| 2009/0284878 A1* | 11/2009 | Critchley | ............... H01H 47/32 361/43 |

(Continued)

FOREIGN PATENT DOCUMENTS

| | | |
|---|---|---|
| JP | 2012-33680 A | 2/2012 |
| KR | 10-2007-0096358 A | 10/2007 |

(Continued)

OTHER PUBLICATIONS

International Search Report dated May 13, 2021 in International Application No. PCT/KR2021/001126.
(Continued)

*Primary Examiner* — Rexford N Barnie
*Assistant Examiner* — Swarna N Chowdhuri
(74) *Attorney, Agent, or Firm* — Saliwanchik, Lloyd & Eisenschenk

(57) ABSTRACT

A relay device according to an embodiment of the present invention comprises: a relay unit in which a switch operates according to a voltage applied to a coil; a first control unit that controls a voltage applied to the coil by turning on and off a first switching element according to a first control signal; a first discharge unit and a second discharge unit that discharge a back electromotive force generated in the coil when the relay unit is turned off; and a second control unit including a second switching element, and controlling the back electromotive force to be discharged through the first discharge unit or the second discharge unit by turning on and off the switching element according to a second control signal.

8 Claims, 13 Drawing Sheets

(51) Int. Cl.
 *B60L 50/60* (2019.01)
 *B60L 53/14* (2019.01)
 *H01H 47/32* (2006.01)

(58) Field of Classification Search
 USPC ........................................................ 307/10.1
 See application file for complete search history.

(56) References Cited

U.S. PATENT DOCUMENTS

2011/0019328 A1   1/2011  Morimoto
2013/0038230 A1*  2/2013  Brown ............... H05B 45/3725
                                                315/312
2018/0301296 A1* 10/2018  Hsu ........................ H03K 17/16

FOREIGN PATENT DOCUMENTS

KR        10-0927452 B1     11/2009
KR        10-1582577 B1      1/2016
KR     10-2019-0115966 A    10/2019

OTHER PUBLICATIONS

Office Action dated Apr. 3, 2025 in Chinese Application No. 202180013651.2.

* cited by examiner

RELAY DEVICE AND ELECTRIC VEHICLE CHARGING CONTROLLER COMPRISING SAME

CROSS-REFERENCE TO RELATED APPLICATIONS

This application is the U.S. national stage application of International Patent Application No. PCT/KR2021/001126, filed Jan. 28, 2021, which claims the benefit under 35 U.S.C. § 119 of Korean Application No. 10-2020-0015865, filed Feb. 10, 2020, the disclosures of each of which are incorporated herein by reference in their entirety.

TECHNICAL FIELD

Embodiments relate to a relay device and an electric vehicle charging controller including the same.

BACKGROUND ART

Eco-friendly vehicles such as electric vehicles (EVs) or plug-in hybrid electric vehicles (PHEVs) use electric vehicle supply equipment (EVSE) installed in charging stations to charge batteries.

To this end, an electric vehicle charging controller (EVCC) is equipped in the EV, communicates with the EV and the EVSE, and controls the charging of the electric vehicle.

For example, when receiving a signal directing the start of charging from the electric vehicle, the EVCC may control the electric vehicle to start charging, and when receiving a signal directing the end of charging from the electric vehicle, the EVCC may control the electric vehicle to end charging.

A charging method of the electric vehicle may be classified into fast charging and slow charging according to a charging time. In the fast charging, the battery is charged by a direct current (DC) supplied from a charger, and in the slow charging, the battery is charged by an alternating current (AC) supplied from the charger. Accordingly, the charger used for the fast charging is called a fast charger or a DC charger, and the charger used for the slow charging is called a slow charger or an AC charger.

The electric vehicles are provided with a relay device to perform various operations such as charging of the battery or vehicle traveling. For example, the electric vehicles may also use the relay device to inhibit an inrush current from being generated in the battery or the like when a high voltage is applied to the electric vehicle supply equipment when charging the battery.

The relay device controls the current by repeating an on-off state. However, there is a problem in that an accurate on-off control is difficult due to a back electromotive force generated in a relay coil upon turn-off. A relay discharge circuit is required to solve this problem.

Technical Problem

An embodiment is directed to providing a relay device having high back electromotive force discharge performance and adaptability to a use environment.

An embodiment is directed to providing an electric vehicle charging controller including a relay device having high back electromotive force discharge performance and adaptability to a use environment.

An embodiment is directed to providing an electric vehicle having a relay device having high back electromotive force discharge performance and adaptability to a use environment.

The objects of the embodiments are not limited to thereto and will also include objects or effects that may be identified from the configurations or embodiments to be described below.

Technical Solution

A relay device according to an embodiment of the present invention includes: a relay unit in which a switch operates according to a magnitude of a voltage applied to a coil; a first control unit configured to control the voltage applied to the coil by turning on and off a first switching element according to a first control signal; a first discharge unit and a second discharge unit configured to discharge a back electromotive force generated in the coil when the relay unit is turned off; and a second control unit including a second switching element, and configured to control the back electromotive force to be discharged through the first discharge unit or the second discharge unit by turning on and off the switching element according to a second control signal.

The second control unit may control the back electromotive force generated in the coil when the first switching element is turned off to be discharged by the first discharge unit by turning off the second switching element.

The second control unit may control the back electromotive force generated in the coil when the first switching element is turned off to be discharged by the second discharge unit by turning on the second switching element.

The first control signal may be a pulse width modulation (PWM) signal.

The first discharge unit may include: a first diode having an anode terminal connected to a first end of the coil; and a second diode having a cathode terminal connected to a cathode terminal of the first diode, and an anode terminal connected to a second end of the coil, a second end of the second switching element, and a first end of the first switching element.

The second discharge unit may include a third diode having a cathode terminal connected to the first end of the coil, and an anode terminal connected to a first end of the second switching element.

The first diode may be a Zener diode.

A relay device according to another embodiment of the present invention includes: a switch; a coil disposed adjacent to the switch; a first diode having an anode terminal connected to a first end of the coil; a second diode having a cathode terminal connected to a cathode terminal of the first diode, and an anode terminal connected to a second end of the coil; a third diode having a cathode terminal connected to the first end of the coil; a first switching element having a first end connected to the anode terminal of the second diode, and a second end connected to a ground terminal; and a second switching element having a first end connected to an anode terminal of the third diode, and a second end connected to the anode terminal of the second diode.

An electric vehicle charging controller according to still another embodiment of the present invention includes: a first signal detection unit connected to a first signal line and configured to detect a first charging sequence signal; a second signal detection unit connected to a second signal line and configured to detect a second charging sequence signal; a relay unit in which a switch operates according to a magnitude of a voltage applied to a coil; a first control unit configured to control the voltage applied to the coil by turning on and off a first switching element according to a first control signal; a first discharge unit and a second discharge unit configured to discharge a back electromotive force generated in the coil when the relay unit is turned off; and a second control unit including a second switching element, and configured to control the back electromotive force to be discharged through the first discharge unit or the second discharge unit by turning on and off the switching element according to a second control signal, wherein the coil is disposed between the first signal line and the second signal line, and has one end connected to a relay of a junction box.

An electric vehicle according to yet another embodiment of the present invention includes: a relay unit in which a switch operates according to a magnitude of a voltage applied to a coil; a first control unit configured to control the voltage applied to the coil by turning on and off a first switching element according to a first control signal; a first discharge unit and a second discharge unit configured to discharge a back electromotive force generated in the coil when the relay unit is turned off; and a second control unit including a second switching element, and configured to control the back electromotive force to be discharged through the first discharge unit or the second discharge unit by turning on and off the switching element according to a second control signal, wherein the switch is disposed between a battery of the electric vehicle and an inverter configured to drive a motor.

Advantageous Effects

According to an embodiment, it is possible to provide a relay device adaptive to a driving situation.

According to an embodiment, it is possible to provide a fast discharge of a back electromotive force generated in a relay coil.

According to an embodiment, it is possible to greatly reduce an electromagnetic interference (EMI) noise when a back electromotive force generated in a relay coil is discharged.

The diverse and beneficial advantages and effects of the present invention are not limited the above-described contents and will be understood more easily in a process of describing the specific embodiments of the present invention.

MODES OF THE INVENTION

Hereinafter, exemplary embodiments of the present invention will be described in detail with reference to the accompanying drawings.

However, the technical spirit of the present invention is not limited to some embodiments described but may be implemented in various different forms, and one or more of the components may be used by being selectively coupled or substituted between the embodiments without departing from the technical spirit scope of the present invention.

In addition, terms (including technical and scientific terms) used in the embodiments of the present invention may be construed as the meaning that may be generally understood by those skilled in the art to which the present invention pertains, unless specifically defined and described explicitly, and the meaning of generally used terms such as terms defined in the dictionary may be construed in consideration of the contextual meaning of the related art.

In addition, the terms used in the embodiments of the present invention are intended to describe the embodiments and are not intended to limit the present invention.

In this specification, the singular form may also include the plural form unless otherwise specified in the phrase, and when it is described as "at least one (or one or more) of A and B, C", it may include one or more of all possible combinations of A, B, and C.

In addition, in describing the components of the embodiment of the present invention, terms such as first, second, A, B, (a), and (b) may be used.

These terms are only intended to distinguish the component from other components, and the essence, sequence, or order of the corresponding components are not limited by the terms.

In addition, when it is described that a component is 'connected', 'coupled', or 'joined' to another component, this may include a case in which the component is not only directly connected, coupled, or joined to another component, but also a case in which the component is 'connected', 'coupled', or joined to another component through other components interposed therebetween.

In addition, when a component is described as being formed or disposed on "top (above) or bottom (below)" of each component, the top (above) or bottom (below) includes not only a case in which two components come into direct contact with each other but also a case in which one or more other components are formed or disposed between the two components. In addition, when expressed as "top (above) or bottom (below)", this may also include the meaning of not only an upward direction but also a downward direction with respect to one component.

Figure 1:
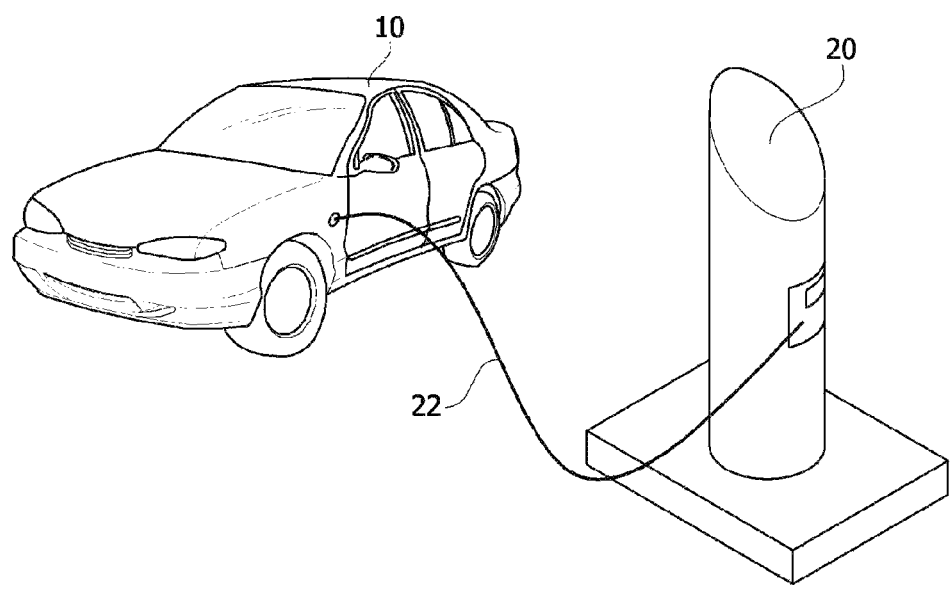
FIG. 1 is a view for describing an electric vehicle charging system according to an embodiment of the present invention.

FIG. 1 is a view for describing an electric vehicle charging system according to an embodiment of the present invention.

An electric vehicle charging system according to an embodiment of the present invention may refer to a system for charging a battery of an electric vehicle operated by using electric energy as power.

Referring to FIG. 1, the electric vehicle charging system according to the embodiment of the present invention may include electric vehicle supply equipment (EVSE) 10 and an electric vehicle (EV) 20.

The electric vehicle supply equipment 10 is equipment configured to supply alternating current (AC) or direct current (DC) power, may be disposed in a charging station or in a home, and may also be implemented to be portable. The electric vehicle supply equipment 10 may be used interchangeably with a supply, an AC supply, and a DC supply. The electric vehicle supply equipment 10 may receive the AC or DC power from a main power source. The main power source may include a power system or the like. The electric vehicle supply equipment 10 may transform or convert the AC or DC power supplied from the main power source to supply the transformed or converted power to the electric vehicle 20.

The electric vehicle 20 refers to a vehicle operated by receiving all or part of energy from an equipped battery. The electric vehicle 20 may include a plug-in hybrid electric vehicle (PHEV) that travels by using an engine using fossil fuel together as well as an electric vehicle that travels only with electric energy charged in the battery. The battery provided in the electric vehicle 20 may be charged by receiving power from the electric vehicle supply equipment 10.

Figure 2:
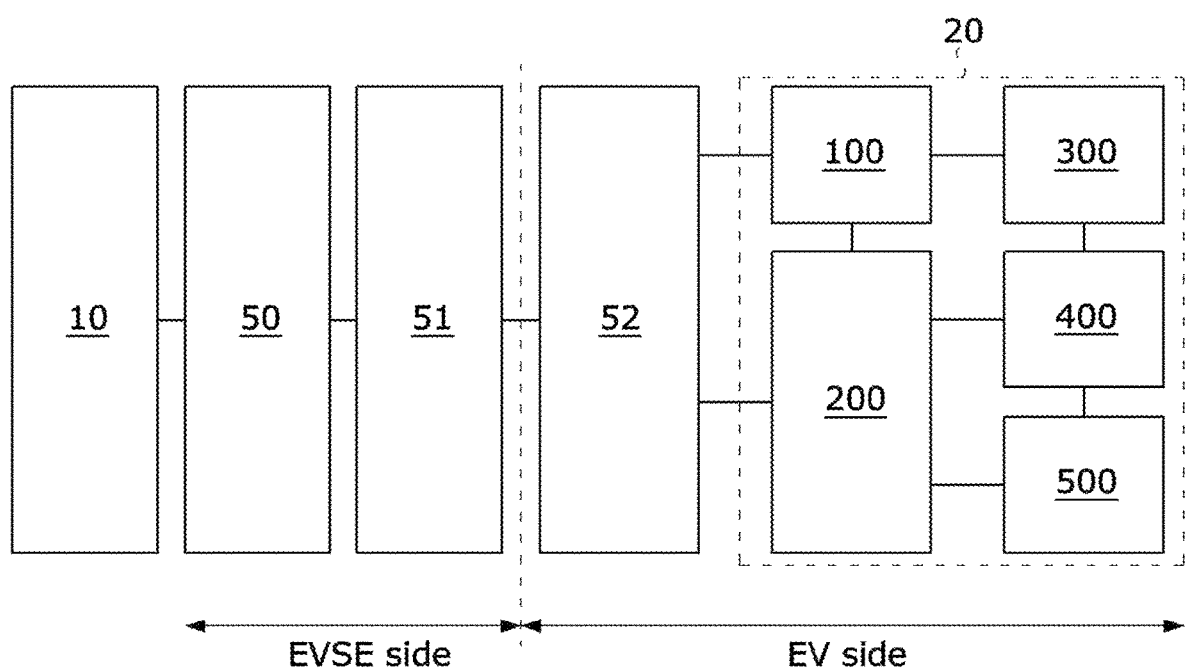
FIG. 2 is a view showing a configuration of the electric vehicle charging system according to the embodiment of the present invention.

FIG. 2 is a view showing a configuration of the electric vehicle charging system according to the embodiment of the present invention.

The electric vehicle charging system according to the embodiment of the present invention may include the electric vehicle supply equipment (EVSE) 10, a cable 50, a connector 51, an inlet 52, a junction box 100, an electric vehicle charging controller (EVCC) 200, a battery 300, a battery management system (BMS) 400, and an electric power control unit (EPCU) 500. A configuration included in the electric vehicle charging system may be classified into a configuration of the electric vehicle supply equipment 10 side (EVSE side) and a configuration of the electric vehicle 20 side (EV side). The configuration of the electric vehicle supply equipment 10 side may include the electric vehicle supply equipment 10, the cable 50, and the connector 51. The configuration of the electric vehicle side may include the inlet 52, the junction box 100, the electric vehicle charging controller 200, the battery 300, the battery management system 400, and the electric power control unit 500. The classification is for convenience of description and is not limited thereto.

First, the electric vehicle supply equipment 10 supplies power for charging the battery 300 of the electric vehicle. The electric vehicle supply equipment 10 may transmit power supplied from the main power source (e.g., the power system) to the electric vehicle 20. At this time, the electric vehicle supply equipment 10 may reduce or convert the power supplied from the main power source to the electric vehicle 20. In one embodiment, when the electric vehicle supply equipment 10 supplies AC power to the electric vehicle 20, the electric vehicle supply equipment 10 may transform the AC power supplied from the main power source to supply the transformed AC power to the electric vehicle 20. In another embodiment, when the electric vehicle supply equipment 10 supplies DC power to the electric vehicle 20, the electric vehicle supply equipment 10 converts the AC power supplied from the main power source into DC power to supply the DC power to the electric vehicle 20. To transform or convert power, the electric vehicle supply equipment 10 may be provided with a power conversion system. In the embodiment, the electric vehicle supply equipment 10 may include a rectifier, an isolation transformer, an inverter, a converter, and the like.

The electric vehicle supply equipment 10 may include a charging control device configured to transmit and receive various control signals necessary for charging the battery 300 of the electric vehicle 20 and control a battery charging process. The charging control device may transmit and receive a control signal to and from the electric vehicle 20 and perform the battery charging process. The control signal may include information such as ready to charge, end of charge, and proximity detection. The charging control device may include a communication device configured to communicate with the electric vehicle 20. The communication device may communicate with the electric vehicle 20 using power line communication (PLC), a controller area network (CAN), or the like. The communication device may also be included in the charging control device or may also be configured separately.

Next, the cable 50, the connector 51, and the inlet 52 electrically connect the electric vehicle supply equipment 10 and the electric vehicle.

The cable 50 transfers power and signals between the electric vehicle supply equipment 10 and the electric vehicle 20. The cable 50 may include a power line transmitting power, a signal line transmitting a control signal related to charging, a ground line connecting a ground, and the like.

The cable 50 is connected to the electric vehicle supply equipment 10. In the embodiment, the electric vehicle supply equipment 10 and the cable 50 may be directly connected without a separate connection configuration. In another embodiment, the electric vehicle supply equipment 10 and the cable 50 may be connected through a combination of a socket-outlet provided in the electric vehicle supply equipment 10 and a plug provided in the cable 50.

The connector 51 may be connected to the cable 50, and the inlet 52 may be provided in the electric vehicle 20. The connector 51 and the inlet 52 may be bundled together to be referred to as a coupler. The connector 51 and the inlet 52 have a structure that may be coupled to each other, and the electric vehicle 20 and the electric vehicle supply equipment 10 may be electrically connected through the coupling between the connector 51 and the inlet 52. The inlet 52 and the connector 51 may be connected not only directly, but also through an adapter.

The connector 51 and the inlet 52 may be provided with a plurality of pins that may be coupled to each other. For example, one of the plurality of pins may be a pin for a CP port through which a control pilot (CP) signal is transmitted between the electric vehicle supply equipment 10 and the electric vehicle charging controller 200, another one may be a pin for a proximity detection (PD) port that detects the proximity of the connector 51 and the inlet 52, and still another one may be a pin for a protective earth (PE) port connected to a protective ground of the electric vehicle supply equipment 10. Yet another one of the plurality of pins may be a pin for driving a motor configured to open a fuel filler flap, yet another one may be a pin for sensing a motor, yet another one may be a pin for sensing a temperature, yet another one may be a pin for sensing a light emitting diode (LED), and yet another one may be a pin for CAN communication. One of the plurality of pins may be a pin for a voltage line applied from a collision detection sensor in the electric vehicle 20, another one may be a battery pin for supplying charging power to the electric vehicle 20, and still another one may be a pin for high voltage protection. However, the number and functions of pins are not limited thereto, and may be variously modified.

The junction box 100 transmits the power supplied from the electric vehicle supply equipment 10 to the battery 300. The power supplied from the electric vehicle supply equipment 10 is a high voltage, and when the high voltage is directly supplied to the battery 300, the battery 300 may be damaged due to an inrush current. The junction box 100 may include at least one relay in order to inhibit damage to the battery due to the inrush current.

The electric vehicle charging controller 200 may control a part or all of the process related to charging the battery of the electric vehicle 20. The electric vehicle charging controller 200 may be referred to as an electric vehicle communication controller (EVCC).

The electric vehicle charging controller 200 may communicate with the electric vehicle supply equipment 10. The electric vehicle charging controller 200 may transmit and receive a control command related to the battery charging process to and from the electric vehicle supply equipment 10. In one embodiment, the electric vehicle charging controller 200 may communicate with a charge control device provided in the electric vehicle supply equipment 10, and may transmit and receive the control command related to the battery charging process to and from the charge control device.

The electric vehicle charging controller 200 may communicate with the electric vehicle 20. The electric vehicle charging controller 200 may receive the control command related to the battery charging process from the electric vehicle 20. In one embodiment, the electric vehicle charging controller 200 may communicate with the battery management system 400 of the electric vehicle 20, and also receive the control command related to the battery charging process from the battery management system 400. In another embodiment, the electric vehicle charging controller 200 may communicate with the electric power control unit 500 of the electric vehicle 20, and receive the control command related to the battery charging process from the electric power control unit 500.

The electric vehicle charging controller 200 may include a micro controller unit (MCU), a communication device, a relay device, and the like in order to perform the above function.

The battery management system 400 manages an energy state of the battery 300 in the electric vehicle 20. The battery management system 400 may monitor a usage status of the battery 300 and perform a control for efficient energy distribution. For example, the battery management system 400 may transmit an available power status of the electric vehicle 20 to a vehicle control unit and an inverter for efficient use of energy. As another example, the battery management system 400 may drive a cooling fan to correct a voltage deviation for each cell of the battery 300 or maintain the battery 300 at an appropriate temperature.

The electric power control unit 500 is a unit configured to control the overall movement of the electric vehicle, including the control of the motor. The electric power control unit 500 may include a motor control unit (MCU), a low voltage DC-DC converter (LDC), and a vehicle control unit (VCU). The motor control unit may be referred to as an inverter. The motor control unit may receive DC power from the battery to convert the DC power into three-phase AC power, and control the motor according to a command of the vehicle control unit. The low voltage DC-DC converter may convert high voltage power into low voltage (e.g., 12 [V]) power to supply the low voltage power to each part of the electric vehicle 20. The vehicle control unit functions to maintain the performance of the system with respect to the electric vehicle 20 as a whole. The vehicle control unit may perform various functions such as charging and vehicle traveling together with various devices such as the motor control unit and the battery management system 400.

Figure 3:
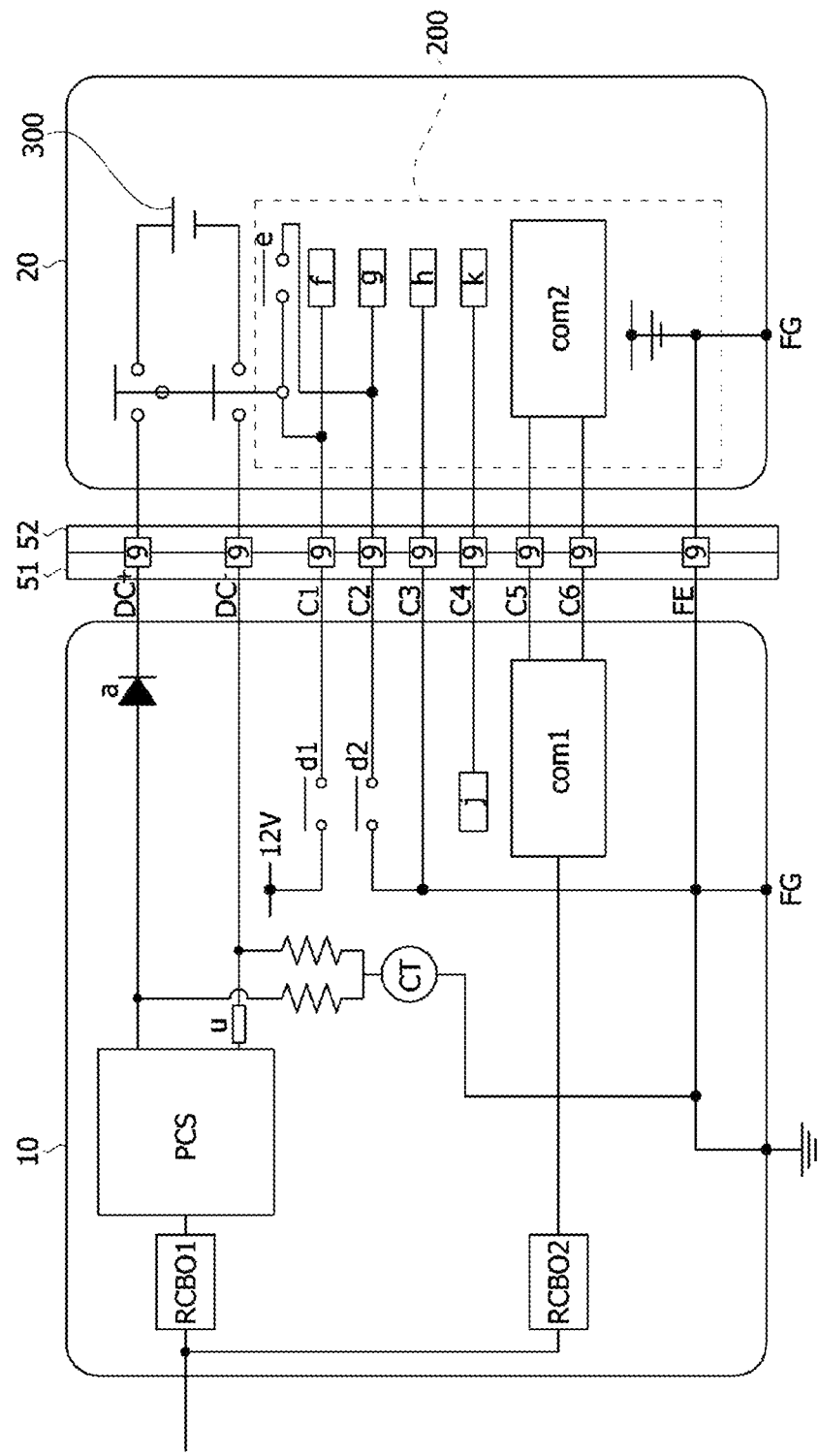
FIG. 3 is a view showing a circuit configuration of the electric vehicle charging system according to one embodiment of the present invention.

FIG. 3 is a view showing a circuit configuration of the electric vehicle charging system according to one embodiment of the present invention.

Referring to FIG. 3, the electric vehicle charging system according to the embodiment of the present invention includes the electric vehicle supply equipment 10, the connector 51, the inlet 52, and the electric vehicle 20.

First, the electric vehicle supply equipment 10 may include overload breakers RCBO1 and RCBO2, a power conversion system PCS, an insulation monitoring device CT, a communication device COM1, a plurality of power lines DC+ and DC−, a plurality of signal lines C1 to C6, and a ground line FE. The plurality of power lines DC+ and DC−, the plurality of signal lines C1 to C6, and the ground line FE may extend to the electric vehicle 20 through the coupling between the connector 51 and the inlet 52.

The electric vehicle supply equipment 10 may receive AC power from the power system. The received AC power may pass through the overload breakers RCBO1 and RCBO2. The overload breakers RCBO1 and RCBO2 may function to block the reception of the AC power when the electric vehicle supply equipment 10 is overloaded.

The AC power passing through the overload breaker RCBO1 is input to the power conversion system PCS, and converted into DC power. The power conversion system PCS supplies the DC power to the electric vehicle 20 through two power lines DC+ and DC−. A diode a configured to block a reverse voltage from the electric vehicle 20 may be disposed on a first power line DC+ of the two power lines DC+ and DC−, and a fuse u configured to inhibit damage due to an overvoltage applied from the electric vehicle 20 may be disposed on a second power line DC−.

The insulation monitoring device CT may be disposed between the two power lines DC+ and DC− and the ground. The insulation monitoring device CT may monitor an insulation status of the two power lines DC+ and DC−.

A first signal line C1 and a second signal line C2 may mean signal lines representing a start/stop state of the electric vehicle supply equipment 10. The first signal line C1 and the second signal line C2 may transmit charging sequence signals, such as ready to charge and end of charge, from the electric vehicle supply equipment 10 to the electric vehicle 20. To this end, a power of 12 [V] may be connected to one end of the first signal line C1, and the ground may be connected to one end of the second signal line C2. In addition, two switch devices d1 and d2 may be disposed on the first signal line C1 and the second signal line C2, respectively. In the electric vehicle supply equipment 10, the two switch devices d1 and d2 may transmit the charging sequence signal to the electric vehicle through an on-off operation.

A third signal line C3 may mean a signal line representing a connection state between the connector 51 and the inlet 52. The third signal line C3 may transmit a proximity signal according to the connection state between the connector 51 and the inlet 52. One end of the third signal line C3 may be connected to the second signal line C2.

A fourth signal line C4 may mean a signal line for approving charging permission for the electric vehicle 20. The fourth signal line C4 may transmit a control signal such as charge start or charge stop from the electric vehicle 20 to the electric vehicle supply equipment 10. The fourth signal line C4 may be connected to a signal detection device j, and the signal detection device j may detect a control signal transmitted through the fourth signal line C4.

A fifth signal line C5 and a sixth signal line C6 may mean signal lines for data communication. The fifth signal line C5 and the sixth signal line C6 may be connected to the communication device COM1.

Next, the electric vehicle may include the junction box 100, the electric vehicle charge controller 200, and the battery 300. The electric vehicle 20 may include the plurality of power lines DC+ and DC−, the plurality of signal lines C1 to C6, and the ground line FE.

The junction box 100 may be connected to the two power lines DC+ and DC−. The junction box 100 may include two contactors c disposed on each of the two power lines DC+ and DC−. The two contactors may be turned on and off by the electric vehicle charging controller 200. The junction box 100 may be connected to the battery 300 through the two power lines DC+ and DC−, and may transmit the DC power received from the electric vehicle supply equipment 10 to the battery 300 to perform charging.

The electric vehicle charging controller 200 may include a relay device e, a plurality of signal detection devices f, g, and h, a switch k, and a communication device COM2. The electric vehicle charging controller 200 may be connected to the plurality of signal lines C1 to C6 and the ground line FE.

The relay device e may be disposed between the first signal line C1 and the second signal line C2. Specifically, one end of the relay device e may be connected to the second signal line C2, and the other end thereof may be connected to the first signal line C1. At this time, the two contactors c may be connected between the other end of the relay device e and the first signal line C1. The relay device e may control the opening and closing of the two contactors c through an opening/closing operation.

A first signal detection device f and a second signal detection device g are connected to the first signal line C1 and the second signal line C2, respectively. The two signal detection devices f and g may detect a signal generated when the two switch devices d1 and d2 provided in the electric vehicle supply equipment 10 are turned on. The two signal detection devices f and g may transmit the detected signal to the micro controller, the vehicle control unit, or the like included in the electric vehicle charging controller 200.

A third signal detection device h is connected to the third signal line C3. The third signal detection device h may detect a signal for detecting the connection state between the connector 51 and the inlet 52.

The switch k is connected to the fourth signal line C4. When the switch k is turned on, a signal indicating the charge start may be transmitted to the electric vehicle supply equipment 10.

The communication device COM2 is connected to the fifth signal line C5 and the sixth signal line C6. The communication device COM2 may communicate with the communication device COM1 through the fifth signal line C5 and the sixth signal line C6.

Figure 4:
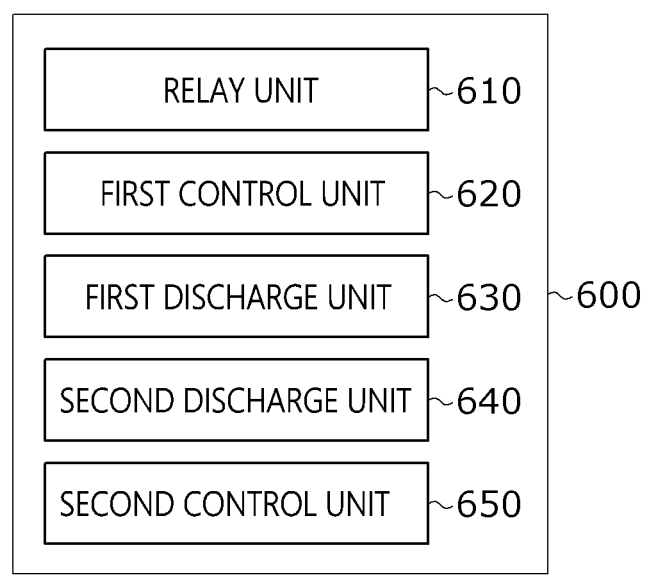
FIG. 4 is a configuration diagram of a relay device according to the embodiment of the present invention.

FIG. 4 is a configuration diagram of a relay device according to the embodiment of the present invention.

The relay device according to the embodiment of the present invention may include a relay unit 610, a first control unit 620, a first discharge unit 630, a second discharge unit 640, and a second control unit 650.

The relay unit 610 includes a switch and a coil. The relay unit 610 operates the switch according to the magnitude of a voltage applied to the coil. When the voltage is cut off while being supplied, a back electromotive force may be generated in the coil.

The first control unit 620 controls the voltage applied to the coil by turning on and off a first switching element according to a first control signal. The first control signal may be a pulse width modulation (PWM) signal. Accordingly, the first switching element periodically repeats turn-on and turn-off operations.

The first discharge unit 630 and the second discharge unit 640 discharge the back electromotive force generated in the coil when the relay unit 610 is turned off. The first discharge unit 630 and the second discharge unit 640 do not simultaneously discharge the back electromotive force generated in the coil. In other words, when the first discharge unit 630 discharges the back electromotive force, the second discharge unit 640 does not discharge the back electromotive force, and when the second discharge unit 640 discharges the back electromotive force, the first discharge unit 630 does not discharge the back electromotive force.

The second control unit 650 includes a second switching element and controls the back electromotive force to be discharged through the first discharge unit 630 or the second discharge unit 640 by turning on and off the switching element according to a second control signal. In other words, the second control unit 650 may select a discharge unit to discharge the back electromotive force generated in the coil.

Specifically, the second control unit 650 may control the back electromotive force generated in the coil when the first switching element is turned off to be discharged by the first discharge unit 630 by turning off the second switching element.

In addition, the second control unit 650 may control the back electromotive force generated in the coil when the first switching element is turned off to be discharged by the second discharge unit 640 by turning on the second switching element.

Figure 5:
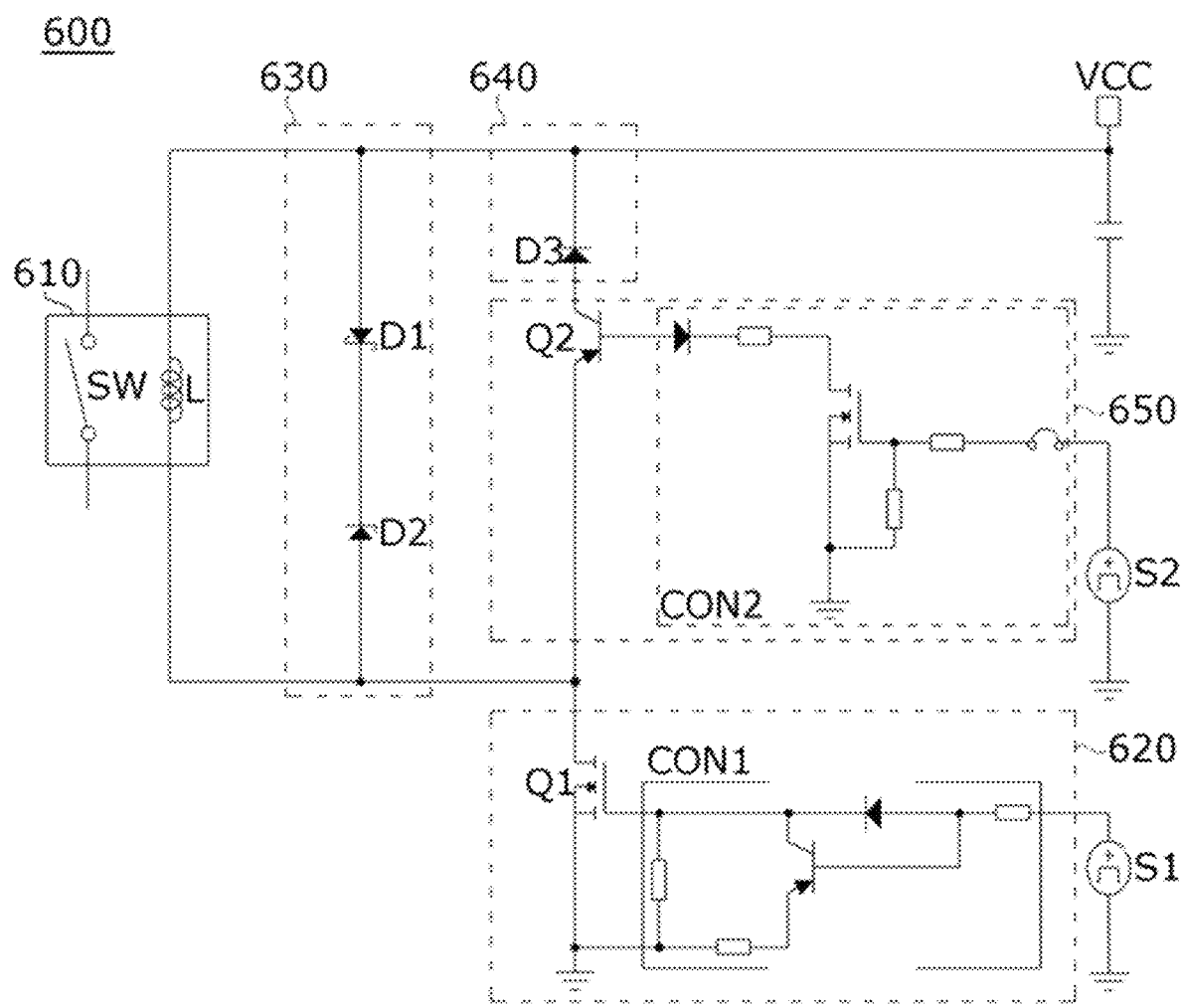
FIG. 5 is a circuit diagram of the relay device according to the embodiment of the present invention.

FIG. 5 is a circuit diagram of the relay device according to the embodiment of the present invention.

The relay unit 610 includes a switch SW and a coil L. The coil L has a magnetic property when a current is applied, and may perform an opening/closing operation by pulling a switch SW made of iron. A first end of the coil L may be connected to a voltage source VCC, and a second end of the coil L may be connected to a first switching element Q1. The switch SW may be connected to one end of a circuit such as an electric vehicle or electric vehicle supply equipment.

The first control unit 620 includes the first switching element Q1 and a first switching control circuit CON1.

The first switching element Q1 may be a metal oxide semiconductor field effect transistor (MOSFET). The first switching element Q1 may include a drain terminal, a source terminal, and a gate terminal. The drain terminal of the first switching element Q1 may be connected to the first discharge unit 630 and the second control unit 650. The source terminal of the first switching element Q1 may be connected to a ground terminal. The gate terminal of the first switching element Q1 may be connected to the first switching control circuit CON1.

The first switching control circuit CON1 controls the opening and closing of the first switching element Q1 according to a received first control signal S1. The first switching control circuit CON1 may control the opening and closing of the first switching element Q1 by applying a voltage to the gate terminal of the first switching element Q1 according to the first control signal S1.

The first discharge unit 630 includes a first diode D1 and a second diode D2.

An anode terminal of the first diode D1 is connected to the first end of the coil. A cathode terminal of the first diode D1 is connected to a cathode terminal of the second diode D2. The first diode D1 may be a Zener diode.

The cathode terminal of the second diode D2 is connected to the cathode terminal of the first diode D1. An anode terminal of the second diode D2 is connected to the second end of the coil L. The anode terminal of the second diode D2 is connected to the first end of the first switching element Q1. The anode terminal of the second diode D2 may be connected to the drain terminal of the first switching element Q1. The anode terminal of the second diode D2 is connected to a second end of a second switching element Q2. The anode terminal of the second diode D2 may be connected to an emitter terminal of the second switching element Q2.

The second discharge unit 640 may include a third diode D3.

A cathode terminal of the third diode D3 is connected to the first end of the coil L. The cathode terminal of the third diode D3 may be connected to the anode terminal of the first diode D1. An anode terminal of the third diode D3 is connected to a first end of the second switching element Q2. The anode terminal of the third diode D3 may be connected to a collector terminal of the second switching element Q2.

The second control unit 650 includes the second switching element Q2 and a second switching control circuit CON2.

The second switching element Q2 may be a bipolar junction transistor (BJT). The second switching element Q2 may include a collector terminal, an emitter terminal, and a base terminal. The collector terminal of the second switching element Q2 may be connected to the anode terminal of the third diode D3. The emitter terminal of the second switching element Q2 may be connected to the second end of the coil L. The emitter terminal of the second switching element Q2 may be connected to the anode terminal of the second diode D2. The emitter terminal of the second switching element Q2 may be connected to the first control unit 620. The base terminal of the second switching element Q2 may be connected to the second switching control circuit CON2.

The second switching control circuit CON2 controls the opening and closing of the second switching element Q2 according to a received second control signal S2. The second switching control circuit CON2 may control the opening and closing of the second switching element Q2 by applying a voltage to the base terminal of the second switching element Q2 according to the second control signal S2.

Next, a driving process of the relay device according to the embodiment of the present invention will be described in detail with reference to FIGS. 6 to 10C.

Figure 6:
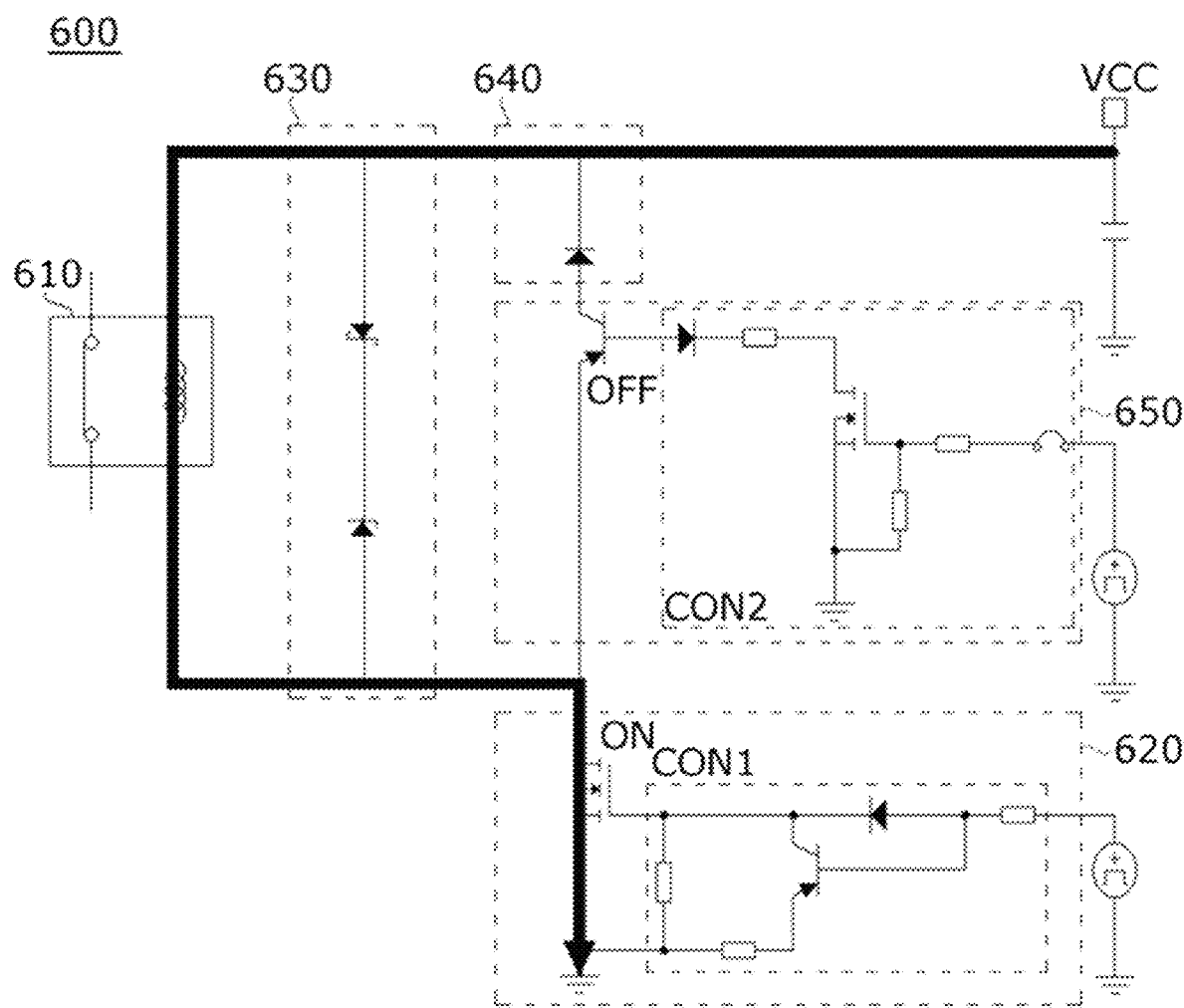
FIG. 6 is a view showing a first driving example of the relay device according to the embodiment of the present invention.

FIG. 6 is a view showing a first driving example of the relay device according to the embodiment of the present invention.

In the first driving example, the first switching control circuit CON1 of the relay device 600 turns on the first switching element Q1 according to the first control signal S1, and the second switching control circuit CON2 turns on the second switching element Q2 according to the second control signal S2. Then, a current I1 flows according to a potential difference between the applied voltage source VCC and the ground. The current I1 passes through the coil L, and the coil L has the magnetic property by the current I1. The coil L having the magnetic property may turn on the switch SW. At this time, no current may flow in the first discharge unit 630 and the second discharge unit 640.

Figure 7:
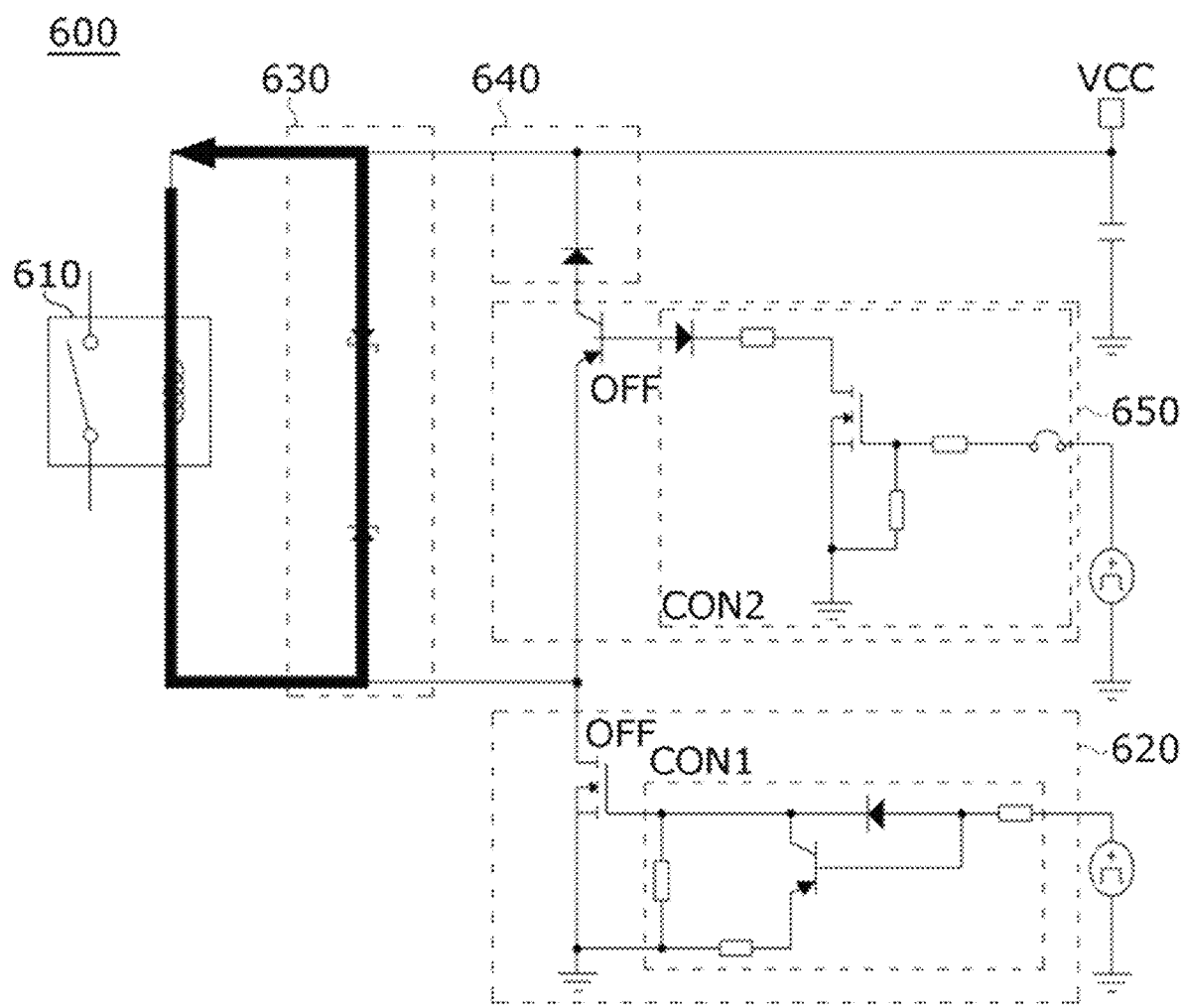
FIG. 7 is a view showing a second driving example of the relay device according to the embodiment of the present invention.

FIG. 7 is a view showing a second driving example of the relay device according to the embodiment of the present invention.

In the second driving example, the first switching control circuit CON1 of the relay device 600 turns off the first switching element Q1 according to the first control signal S1, and the second switching control circuit CON2 turns on the second switching element Q2 according to the second control signal S2. Since the first switching element Q1 is turned off, an electrical connection between the applied voltage source VCC and the ground is cut off. Accordingly, a back electromotive force is generated in the coil L. At this time, since the second switching element Q2 is in a state of being turned on, a current I2 due to the back electromotive force flows through a closed circuit formed by the coil L of the relay unit 610, the second discharge unit 640, and the second switching element Q2. Then, the back electromotive force may be discharged through the third diode D3 of the second discharge unit 640 in the closed circuit. At this time, the second discharge unit 640 may not be involved in the discharge of the back electromotive force.

When the back electromotive force is discharged by the first discharge unit 630, the first diode D1 and the second diode D2 are involved in the reflux of the back electromotive force. In this case, the voltage of the coil L may be increased by the magnitudes of the voltages applied to the first diode D1 and the second diode D2. Accordingly, it is possible to quickly discharge the back electromotive force. However, an electromagnetic interference (EMI) noise may increase due to a sudden increase in the magnitude of the voltage.

Figure 8:
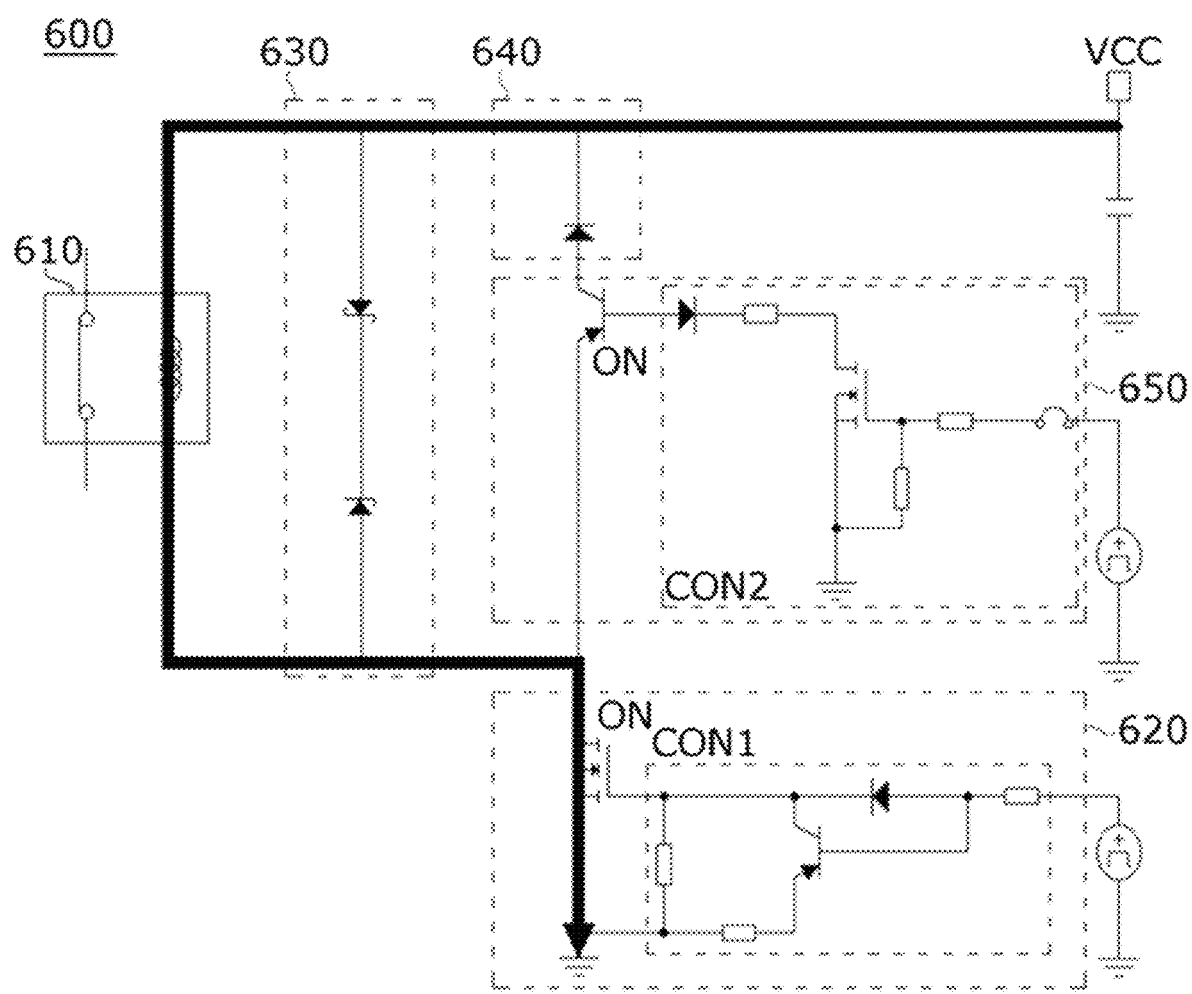
FIG. 8 is a view showing a third driving example of the relay device according to the embodiment of the present invention.

FIG. 8 is a view showing a third driving example of the relay device according to the embodiment of the present invention.

In the third driving example, the first switching control circuit CON1 of the relay device 600 turns on the first switching element Q1 according to the first control signal S1, and the second switching control circuit CON2 turns off the second switching element Q2 according to the second control signal S2. Then, a current I3 flows according to the potential difference between the applied voltage source VCC and the ground. The current I3 passes through the coil L, and the coil L has the magnetic property by the current I3. The coil L having the magnetic property may turn on the switch SW. At this time, no current may flow in the first discharge unit 630 and the second discharge unit 640.

Figure 9:
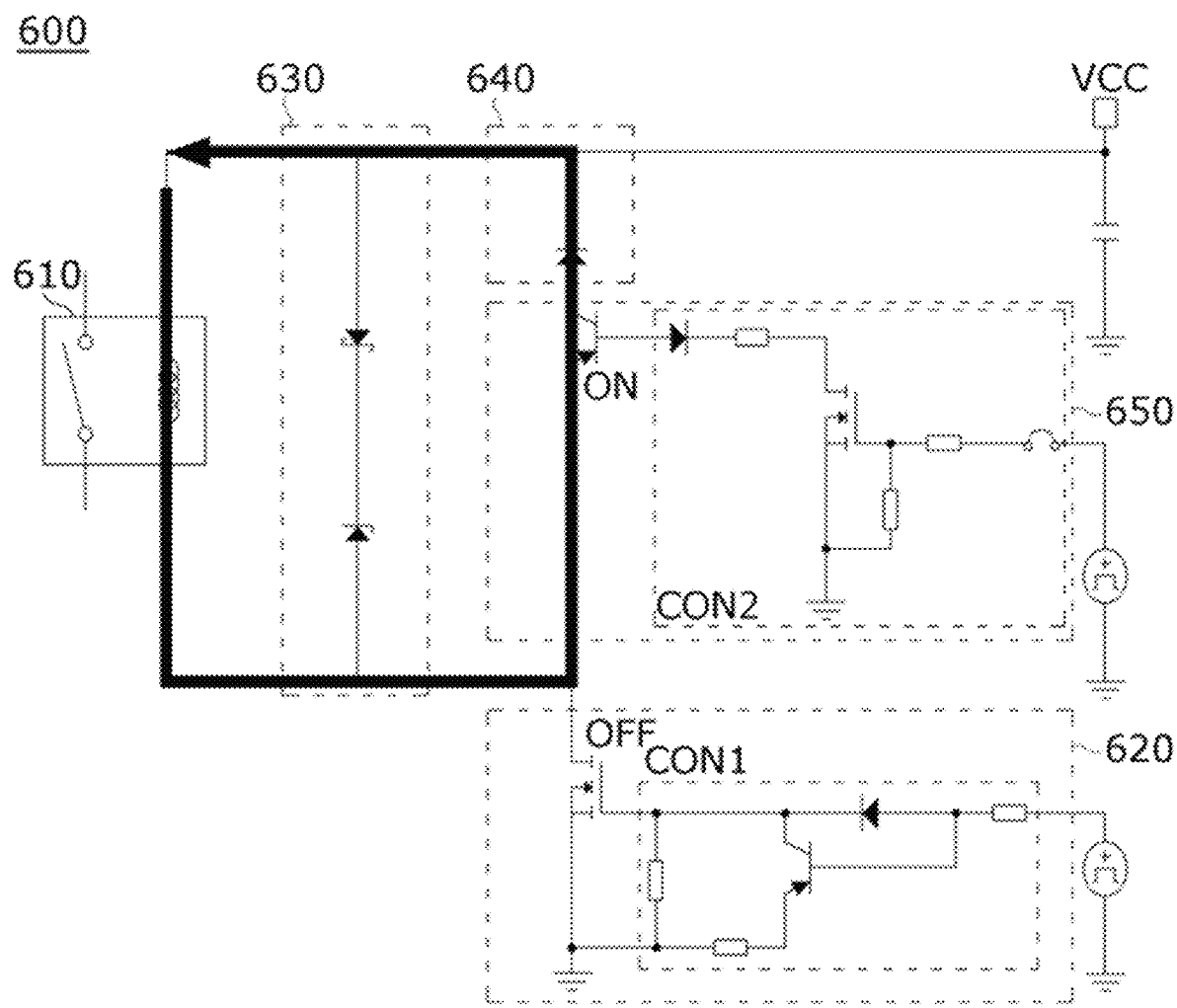
FIG. 9 is a view showing a fourth driving example of the relay device according to the embodiment of the present invention.

FIG. 9 is a view showing a fourth driving example of the relay device according to the embodiment of the present invention.

In the fourth driving example, the relay device turns off the first switching element Q1 and turns off the second switching element Q2. Since the first switching element Q1 is turned off, the electrical connection between the applied voltage source and the ground is cut off. Accordingly, the back electromotive force is generated in the coil. At this time, since the second switching element Q2 is also in a state of being turned off, the current due to the back electromotive force does not flow to the second discharge unit 640. The current due to the back electromotive force flows through the closed circuit formed by the coil of the relay unit 610 and the first discharge unit 630. Then, the back electromotive force may be discharged through the first diode and the second diode of the second discharge unit 640 in the closed circuit. At this time, the first discharge unit 630 may not be involved in the discharge of the back electromotive force.

When the back electromotive force is discharged by the second discharge unit 640, the third diode D3 is involved in the reflux of the back electromotive force. In this case, the voltage of the coil L may be increased by the magnitude of the voltage applied to the third diode D3. Since there is no sudden increase in the magnitude of the voltage, the electromagnetic interference (EMI) noise may be low. However, since only the third diode D3 is involved in the reflux of the back electromotive force, a discharge speed of the back electromotive force may be slow.

According to the first to fourth driving examples described with reference to FIGS. 6 to 9, the discharge of the back electromotive force by the first discharge unit 630 and the discharge of the back electromotive force by the second discharge unit 640 have advantages and disadvantages opposite to each other. In consideration of this point, the relay unit 610 according to the embodiment of the present invention proposes a method of selecting a discharge method according to items required for a disposed environment. The relay device according to the embodiment of the present invention may operate according to the first driving example and the second driving example in an environment in which circuit stability needs to be enhanced by minimizing the occurrence of the EMI noise. On the other hand, in an environment in which a fast discharge of the back electromotive force is required, the relay device may operate according to the third and fourth driving examples.

Figure 10A:
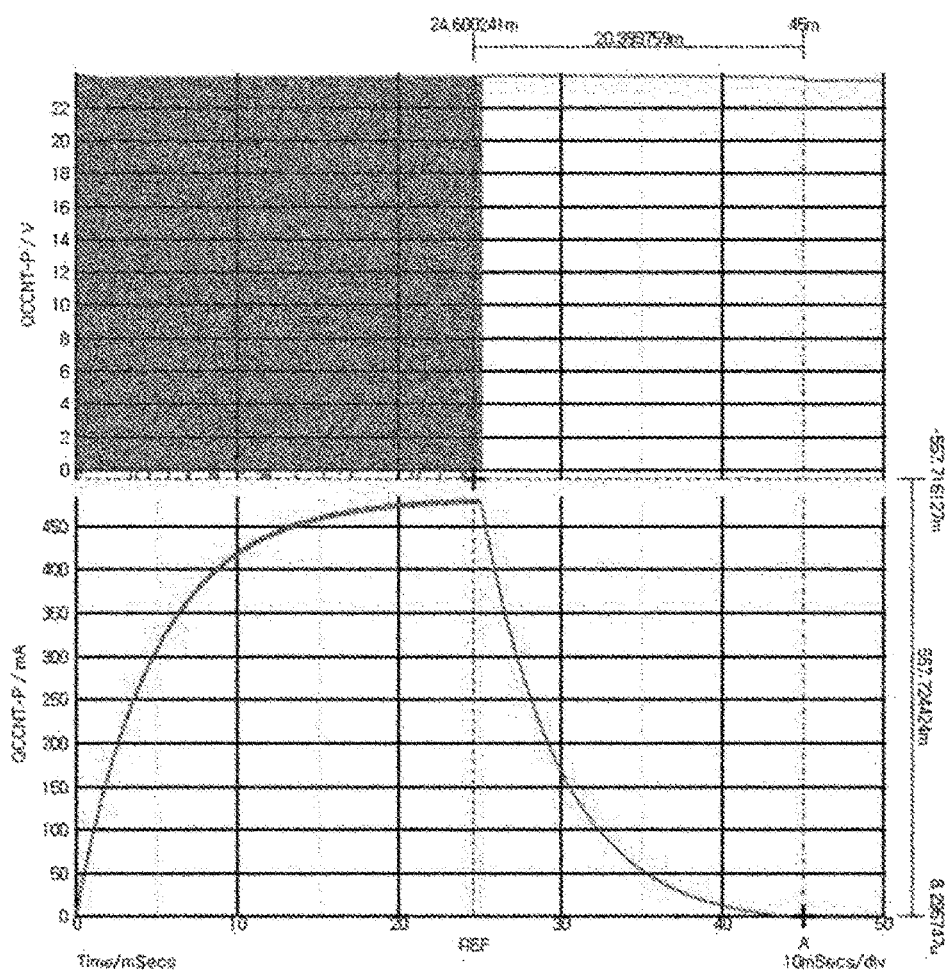
FIGS. 10A to 10C show simulation results of the relay device according to the embodiment of the present invention.
Figure 10B:
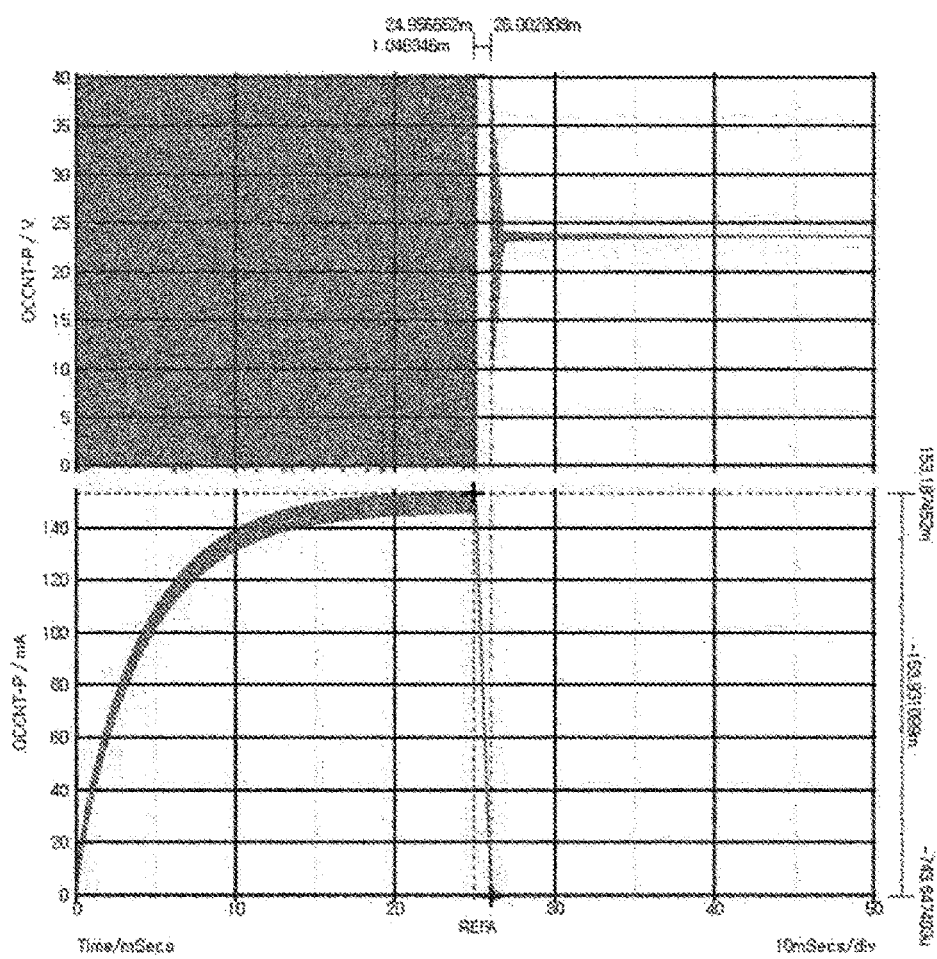
Figure 10C:
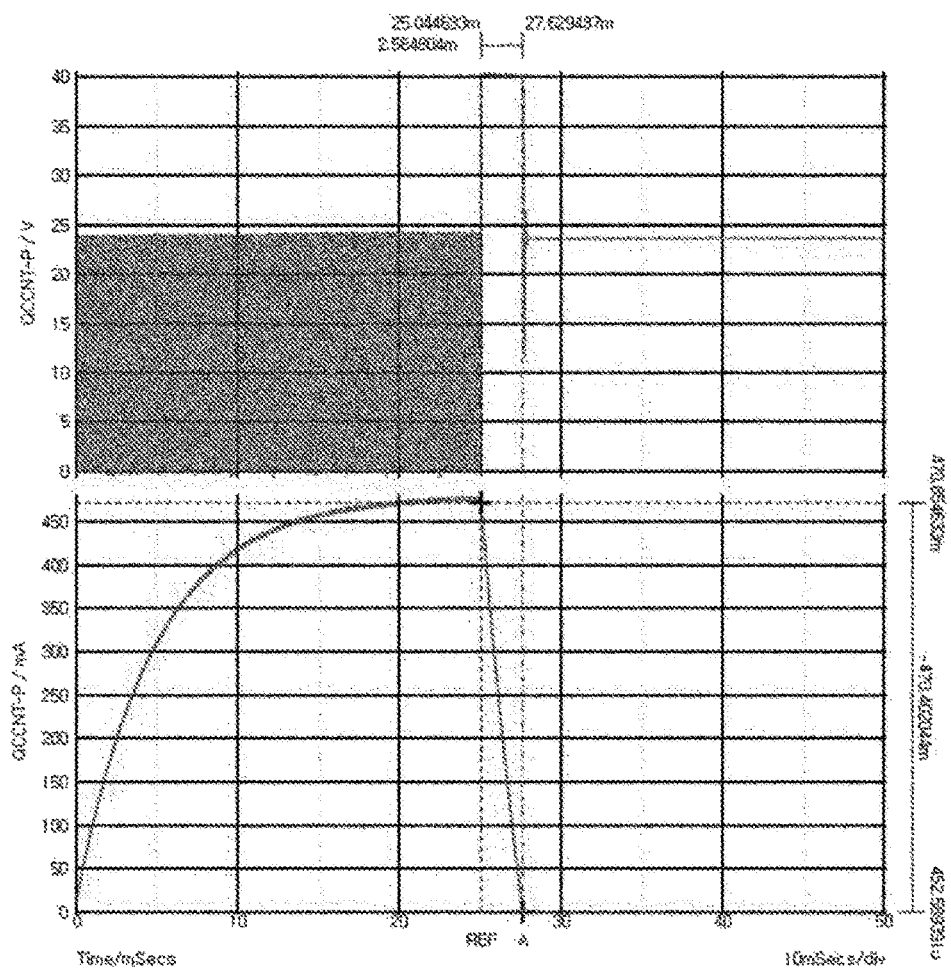

FIGS. 10A to 10C show simulation results of the relay device according to the embodiment of the present invention.

FIG. 10A shows the simulation result for the relay device including only the first discharge unit, FIG. 10B shows the simulation result for the relay device including only the second discharge unit, and FIG. 10C shows the simulation result for the relay device according to the embodiment of the present invention.

TABLE 1

| | Case 1 | Case 2 | Case 3 |
|---|---|---|---|
| Peak voltage (V) when first switching element is turned on | 40 | 23.5 | 23.5 |
| Discharge time of back electromotive force when first switching element is turned off | 1 | 20.3 | 2.5 |

As shown in Table 1, in the relay device including only the first discharge unit, the peak voltage when the first switching element is turned on is 40 [V], and the discharge time of the back electromotive force when the first switching element is turned off is 1 [ms], so that it can be seen that the discharge time is short but the EMI noise is high due to the high peak voltage. In the relay device including only the second discharge unit, the peak voltage when the first switching element is turned on is 23.5 [V], and the discharge time of the back electromotive force when the first switching element is turned off is 20.3 [ms], so that it can be seen that the EMI noise is low due to the low peak voltage but the discharge time is slow. However, in the relay device according to the embodiment of the present invention, the peak voltage when the first switching element is turned on is 23.5 [V], and the discharge time of the back electromotive force when the first switching element is turned off is 2.5 [ms], so that it can be seen that the EMI noise is low due to the low peak voltage and at the same time, fast discharge is possible.

Figure 11:
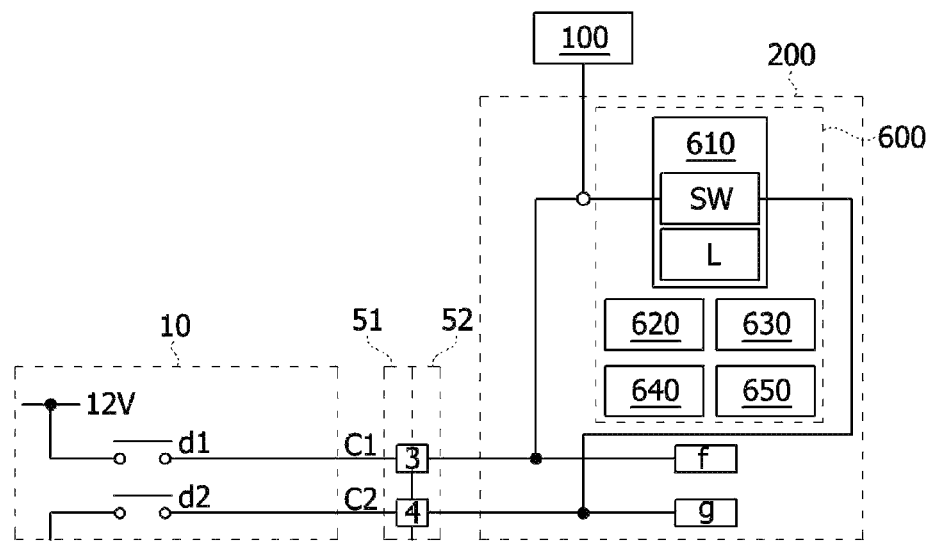
FIG. 11 is a view showing an electric vehicle charging controller according to the embodiment of the present invention.

FIG. 11 is a view showing an electric vehicle charging controller according to the embodiment of the present invention. The electric vehicle charging controller 200 according to the embodiment of the present invention may transmit and receive signals to and from the electric vehicle supply equipment 10 through a plurality of signal lines and a ground line, and control the battery charging sequence using the transmitted and received signals.

The electric vehicle charging controller 200 according to the embodiment of the present invention may include a first signal detection unit f and a second signal detection unit g. The first signal detection unit f is connected to a first signal line C1 and detects a first charging sequence signal. The second signal detection unit g is connected to a second signal line C2 and detects a second charging sequence signal. The first signal detection unit f detects the first charging sequence signal generated according to an on-off state of a first switch d1 of the electric vehicle supply equipment 10. The second signal detection unit g detects the second charging sequence signal generated according to an on-off state of a second switch d2 of the electric vehicle supply equipment 10.

The electric vehicle charging controller 200 may include the relay device 600 according to the embodiment of the present invention. The relay device 600 may be disposed between the first signal detection unit f and the second signal detection unit g. The relay device 600 may be disposed between the first signal line C1 and the second signal line C2. One end of the switch SW of the relay unit 610 included in the relay device 600 may be connected to the second signal line C2. The other end of the switch of the relay unit 610 included in the relay device 600 may be connected to the first signal line C1. At this time, the junction box 100 may be connected between the other end of the switch SW and the first signal line C1.

The on and off operation of the switch SW is controlled by driving the first control unit 620, the first discharge unit 630, the second discharge unit 640, and the second control unit 650 of the relay device 600, and in the off state, the back electromotive force generated in the coil L is discharged. A relay of the junction box 100 may be repeatedly turned on and off according to the on-off operation of the relay device 600. The relay device 600 according to the embodiment of the present invention functions to protect the battery from the high voltage power source of the electric vehicle supply equipment by turning on and off the relay of the junction box 100 by repeatedly turning on and off the relay unit 610. At this time, the relay device 600 may stably control the operation of the junction box 100 by rapidly discharging the back electromotive force generated in the repeated on and off state of the relay unit 610 or by operating to minimize the occurrence of the EMI noise.

Figure 12:
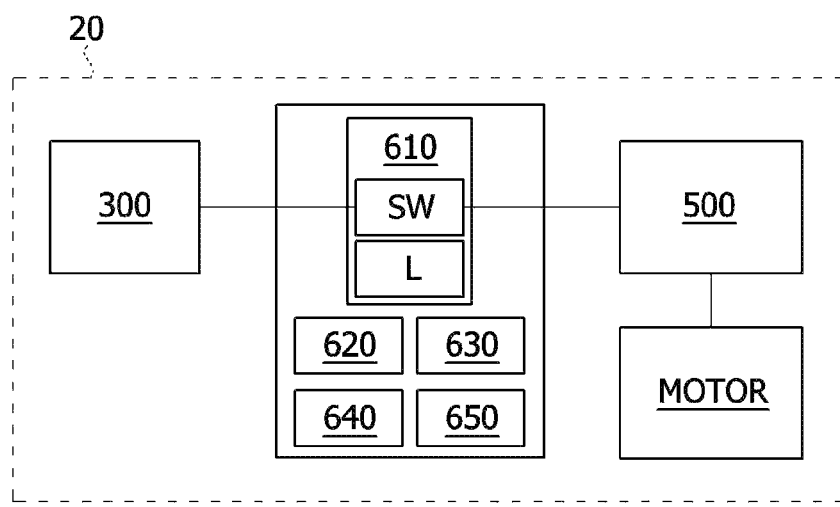
FIG. 12 is a view showing an electric vehicle according to the embodiment of the present invention.

FIG. 12 is a view showing an electric vehicle according to the embodiment of the present invention.

The electric vehicle 20 according to the embodiment of the present invention may be driven by converting the power of the battery 300 to transmit the converted power to the motor by the electric power control unit 500. More specifically, the electric vehicle 20 may be driven by converting the power of the battery 300 to transmit the converted power to the motor by the motor control unit (inverter) of the electric power control unit 500.

The electric vehicle 20 may include the relay device 600. The relay device 600 may be disposed between the battery 300 and the electric power control unit 500. One end of the switch SW of the relay unit 610 included in the relay device 600 is connected to the battery 300, and the other end thereof is connected to the electric power control unit 500. The on and off operation of the switch SW is controlled by driving the first control unit 620, the first discharge unit 630, the second discharge unit 640, and the second control unit 650 of the relay device 600, and in the off state, the back electromotive force generated in the coil L is discharged.

The relay device 600 according to the embodiment of the present invention can inhibit damage to a capacitor that is generated as the high voltage power of the battery is supplied to the motor control unit of the electric power control unit 500 by repeatedly turning on and off the relay unit 610. The relay device 600 can improve the stability of the electric power control unit 500 by rapidly discharging the back electromotive force generated in the repeated on and off state of the relay unit or by operating to minimize the occurrence of the EMI noise.

While the embodiments have been mainly described above, this is merely illustrative and does not limit the present invention, and those skilled in the art to which the present invention pertains will be able to understand that various modifications and applications not exemplified above are possible without departing from the essential characteristics of these embodiments. For example, each component specifically described in the embodiments may be modified and embodied. In addition, differences related to the modifications and applications should be construed as being included in the scope of the present invention defined in the appended claims.

The invention claimed is:

1. A relay device comprising:
a relay unit comprising a switch operating according to a magnitude of a voltage applied to a coil; a first control unit configured to control the voltage applied to the coil by turning on and off a first switching element according to a first control signal; a first discharge unit and a second discharge unit configured to discharge a back electromotive force generated in the coil when the relay unit is turned off; and a second control unit including a second switching element, wherein the second switching element is configured to be turned on or off based on a second control signal to select whether the back electromotive force generated in the coil is discharged through the first discharge unit or the second discharge unit.

2. The relay device of claim 1, wherein the second control unit is configured to control the back electromotive force generated in the coil when the first switching element is turned off to be discharged by the first discharge unit by turning off the second switching element.

3. The relay device of claim 1, wherein the second control unit is configured to control the back electromotive force generated in the coil when the first switching element is turned off to be discharged by the second discharge unit by turning on the second switching element.

4. The relay device of claim 1, wherein the first control signal is a pulse width modulation (PWM) signal.

5. The relay device of claim 1, wherein the first discharge unit includes: a first diode having an anode terminal connected to a first end of the coil; and a second diode having a cathode terminal connected to a cathode terminal of the first diode, and an anode terminal connected to a second end of the coil, a second end of the second switching element, and a first end of the first switching element.

6. The relay device of claim 5, wherein the second discharge unit includes a third diode having a cathode terminal connected to the first end of the coil, and an anode terminal connected to a first end of the second switching element.

7. The relay device of claim 5, wherein the first diode is a Zener diode.

8. A relay device comprising:
a switch; a coil disposed adjacent to the switch; a first diode having an anode terminal connected to a first end of the coil; a second diode having a cathode terminal connected to a cathode terminal of the first diode, and an anode terminal connected to a second end of the coil; a third diode having a cathode terminal connected to the first end of the coil; a first switching element having a first end connected to the anode terminal of the second diode, and a second end connected to a ground terminal; and a second switching element having a first end connected to an anode terminal of the third diode, and a second end connected to the anode terminal of the second diode, wherein the second switching element is configured to be turned on or off based on a control signal to select whether back electromotive force generated in the coil is discharged through the first diode and the second diode or the third diode.

* * * * *